(12) United States Patent
Boulmedais et al.

(10) Patent No.: US 11,827,747 B2
(45) Date of Patent: Nov. 28, 2023

(54) ARGININE-BASED ANTIBACTERIAL POLYMERS WITH UCST PROPERTY

(71) Applicants: Centre National de la Recherche Scientifique, Paris (FR); Institut National de la Santé et de la Recherche Médicale (INSERM), Paris (FR); Université de Strasbourg, Strasbourg (FR)

(72) Inventors: Fouzia Boulmedais, Strasbourg (FR); Delphine Chan-Seng, Strasbourg (FR); Nicolas Zydziak, Karlshruhe (DE); Philippe Lavalle, Wintzenheim (FR)

(73) Assignees: CENTRE NATIONAL DE LA RECHERCHE SCIENTIFIQUE, Paris (FR); INSTITUT NATIONAL DE LA SANTÉ ET DE LA RECHERCHE MÉDICALE (INSERM), Paris (FR); UNIVERSITÉ DE STRASBOURG, Strasbourg (FR)

( * ) Notice: Subject to any disclaimer, the term of this patent is extended or adjusted under 35 U.S.C. 154(b) by 201 days.

(21) Appl. No.: 17/609,155

(22) PCT Filed: May 6, 2020

(86) PCT No.: PCT/EP2020/062614
§ 371 (c)(1),
(2) Date: Nov. 5, 2021

(87) PCT Pub. No.: WO2020/225322
PCT Pub. Date: Nov. 12, 2020

(65) Prior Publication Data
US 2022/0213265 A1    Jul. 7, 2022

(30) Foreign Application Priority Data
May 6, 2019   (EP) ..................... 19305572

(51) Int. Cl.
*C08G 69/10* (2006.01)
*C08G 69/46* (2006.01)

(52) U.S. Cl.
CPC ............. *C08G 69/10* (2013.01); *C08G 69/46* (2013.01)

(58) Field of Classification Search
None
See application file for complete search history.

(56) References Cited

U.S. PATENT DOCUMENTS

| 2011/0008441 A1 | 1/2011 | Chu et al. |
| 2012/0208972 A1* | 8/2012 | Bookbinder .......... C08F 220/70 |
| | | 526/238.1 |

FOREIGN PATENT DOCUMENTS

EP    2826493 A1 *   1/2015

OTHER PUBLICATIONS

Strucuture search by STIC of USPTO, Jul. 5, 2023.*
(Continued)

*Primary Examiner* — Tae H Yoon
(74) *Attorney, Agent, or Firm* — WC&F IP

(57) ABSTRACT

The present invention concerns a polymer comprising repetitive units having the following formula (I) wherein $R_1$ is H or Me; L is a linker; $R_2$ is the side chain of an α-amino acid being other than arginine; m is 0 or an integer comprised from 1 to 10; n is an integer comprised from 1 to 10; and X— is a counterion.

(I)

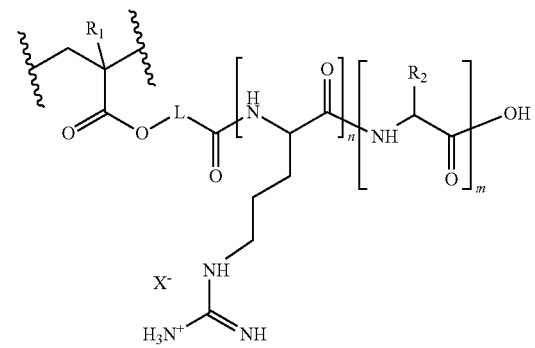

15 Claims, 1 Drawing Sheet

(56) References Cited

OTHER PUBLICATIONS

Qu et al., Searching for new strategies against polymicrobial biofilm infections: guanylated polymethacrylates kill mixed fungal/basterial biofilms, Journal of Antimicrobial Chemotherapy, Vo. 71, Issue 2, Feb. 2016, pp. 413-421.*

Hu et al., Poly(amino acid-hydroxyethyl methacrylate)s with chiral lysine and/or leucine side moieties and their antibacterial abilities for biomedical applications, Materials Science and Engineering:C, vol. 76, Jul. 1, 2017, pp. 1112-1120.*

Prather et al.; "Aqueous Liquid-Liquid Phase Separation of Natural and Synthetic Polyguanidiniums"; Polymers, vol. 11, No. 4, Apr. 1, 2019, abstract, para. 2.5-2.6.

Ten Cate et al.; "Synthesis of ABC-Triblock Peptide-Polymer Conjugates for the Positioning of Peptide Segments Within Block Copolymer Aggregates"; Macromolecular Chemistry and Physics, vol. 208, No. 13, Jul. 3, 2007, pp. 1437-1446.

* cited by examiner

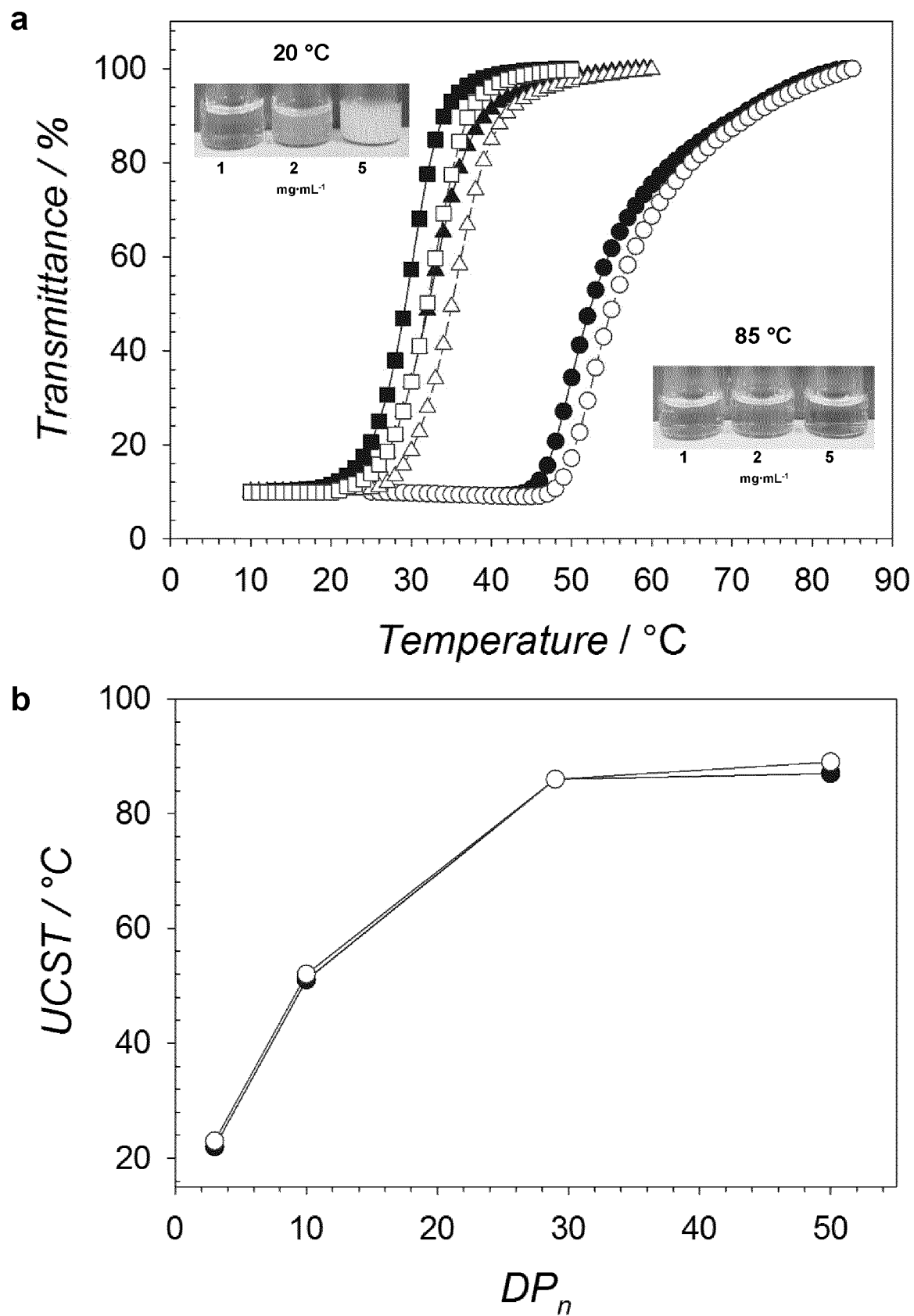

ARGININE-BASED ANTIBACTERIAL POLYMERS WITH UCST PROPERTY

CROSS-REFERENCE TO RELATED APPLICATIONS

This application is a 371 National Stage Application, which claims the benefit of International Application No. PCT/EP2020/062614, filed on Nov. 5, 2021, which claims priority to European Patent Application No. 19305572.0, filed on May 6, 2019, the contents of which are hereby incorporated by references in their entirety.

The present invention concerns arginine-based antibacterial polymers, said polymers having UCST properties. It also concerns a method for the preparation of said polymers and also the use of said polymers for example for the delivery or encapsulation of a drug or as antibacterial compound.

Thermoresponsive materials with lower critical solution temperature (LOST) or upper critical solution temperature (UCST) undergo drastic changes in solubility with phase separation upon heating or cooling, respectively (D. Roy, W. L. A. Brooks, B. S. Sumerlin, *Chem. Soc. Rev.* 2013, 42, 7214; and Y.-J. Kim, Y. T. Matsunaga, *J. Mater. Chem. B* 2017, 5, 4307). While water-soluble polymers with a LOST have been widely investigated, polymers with UCST are much more rare even though is such polymers have recently attracted increasing interest. Indeed, these latter polymers currently find applications in biomedicine including drug delivery (W. Li, L. Huang, X. Ying, Y. Jian, Y. Hong, F. Hu, Y. Du, *Angew. Chem. Int. Ed.* 2015, 54, 3126; L. Hui, S. Qin, L. Yang, *ACS Biomater. Sci. Eng.* 2016, 2, 2127; and M. Hei, J. Wang, K. Wang, W. Zhu, P. X. Ma, *J. Mater. Chem. B* 2017, 5, 9497), catalysis and 3D-printed scaffolds. The UCST-type behavior of polymers can be promoted either by hydrogen bonding or Coulomb interactions (J. Seuring, S. Agarwal, *Macromol. Rapid Commun.* 2012, 33, 1898; and J. Seuring, S. Agarwal, *ACS Macro Lett.* 2013, 2, 597). Non-ionic polymers with hydrogen bonding-induced UCST phase transitions, such as poly(acrylamide-co-acrylonitrile) (J. Seuring, S. Agarwal *Macromolecules* 2012, 45, 3910) and poly(N-acryloyl glycinamide), have attracted much attention due to their relative insensitivity to pH and ionic strength (at least up to physiological conditions). Copolymerization of hydrogen bonding and charged monomers yields pH-sensitive UCST materials exploiting a delicate balance between electrostatic interactions and hydrogen bonding. Copolymerization of ureido- and allyl-based acrylates have allowed the rational design of copolymers with a targeted UCST depending on the hydrophobic parameter. Agarwal provided guidelines for the design of such copolymers indicating that they should "possess strong hydrogen donors and acceptors, contain no or very few ionic groups, be hydrolytically stable and consist of chains with homogeneous copolymer composition" (J. Seuring, S. Agarwal, *ACS Macro Lett.* 2013, 2, 597). Fully charged polymers are not expected to exhibit UCST behavior in water within the 0-100° C. range. Zwitterionic polymers possess this phase transition thanks to attractive Coulomb interactions. Addition of specific counterions, such as halogen anions, hydrophobic counterions or multivalent ions, is a requirement to obtain UCST behavior of fully charged polyelectrolytes (J. Niskanen, H. Tenhu, *Polym. Chem.* 2017, 8, 220).

Amino acid-containing polymers are of particular interest for biomedical applications, e.g. polymers with arginine residues are used for their antimicrobial activity (K. J. Cutrona, B. A. Kaufman, D. M. Figueroa, D. E. Elmore, *FEBS Lett.* 2015, 589, 3915) and their ability to promote drug vectorization (C.-H. Tung, R. Weissleder, *Adv. Drug Deliv. Rev.* 2003, 55, 281). Only a few UCST polymers containing α-amino acid residues have been developed so far, either by modification of polypeptides or (co)polymerization of monomers bearing only one amino acid on their side chains. These polymers can be classified according to the interaction triggering the UCST. Non-ionic vinyl polymers bearing one amino acid residue (aliphatic or aromatic) have been synthesized to study their thermo-responsiveness in water (N. Higashi, R. Sonoda, T. Koga, *RSC Adv.* 2015, 5, 67652). Among them, only alanine-based polymers exhibit an UCST at pH 2.0 due to the protonation of the terminal carboxylic acid group.

The aim of the present invention is thus to provide arginine-containing polymers with antibacterial properties.

The aim of the present invention is also to provide arginine-containing polymers with UCST properties.

Therefore, the present invention relates to a polymer comprising repetitive units having the following formula (I):

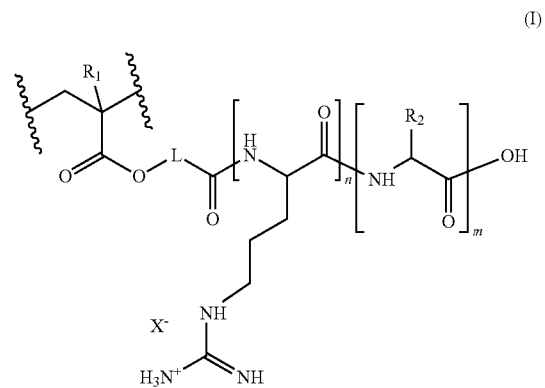

(I)

wherein:
R$_1$ is H or Me;
L is a linker;
R$_2$ is the side chain of an α-amino acid being other than arginine;
m is 0 or an integer comprised from 1 to 10, and preferably from 1 to 5;
n is an integer comprised from 1 to 10, and preferably from 3 to 10; and
X$^-$ is a counterion.

The polymers of the invention are thus made of repetitive units derived of (meth)acrylate monomers comprising arginine residues. The (meth)acrylate and poly(arginine) residues are linked together through a linker L.

According to an embodiment, the linker L has the following formula (II):

-A$_1$-A$_2$-A$_3$-  (II)

wherein:
A$_1$ is a (C$_1$-C$_6$)alkylene group;
A$_2$ is a group obtainable by alkyne-azide cycloaddition reaction; and
A$_3$ is a (C$_1$-C$_{10}$)alkylene group, possibly interrupted by one or several oxygen atoms.

As used herein, the term "alkylene" (or "alkylidene") refers to a divalent group comprising, unless otherwise mentioned, from 1 to 10, preferably from 1 to 6, and more preferably from 1 to 4 carbon atoms. It corresponds to an alkyl group by removal of a further hydrogen atom. When said group is linear, it may be represented by the formula ($CH_2$), wherein for example i is an integer varying from 1 to 6. The following alkylene groups may be cited as example: methylene, ethylene, propylene, butylene, pentylene, or hexylene.

According to the present invention, the expression "($C_t$-$C_z$)alkyl" means an alkyl group which can have from t to z carbon atoms.

Within the present application, the term "an alkyl group" means a linear or branched, saturated or unsaturated, hydrocarbon-based aliphatic group comprising, unless otherwise mentioned, from 1 to 6, preferably from 1 to 4 carbon atoms. By way of examples, mention may be made of methyl, ethyl, n-propyl, isopropyl, butyl, isobutyl, tert-butyl or pentyl groups.

In the above formula (II), $A_1$ is preferably —$CH_2$—.

In the above formula (II), $A_3$ is either an alkylene group as defined above or an oligo(ethylene glycol) chain (corresponding to an alkylene group interrupted by one or several oxygen atoms). Preferably, $A_3$ is —$(CH_2)_5$—.

As defined above in formula (II), $A_2$ is a group obtainable by a click chemistry reaction that is the alkyne-azide cycloaddition reaction, and preferably the copper-assisted azide-alkyne cycloaddition or copper-catalyzed azide-alkyne cycloaddition (CuAAC). It is thus obtained by the reaction between an azide and an alkyne.

According to an embodiment, in formula (II), $A_2$ is a triazole group.

According to an embodiment, the polymers of the invention comprise a linker L having the following formula:

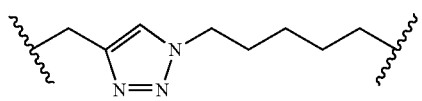

(III)

In the above formula (I), the counterion $X^-$ is preferably chosen from anionic counterions such as chloride and trifluoroacetate anions.

The repetitive units of the polymers of the invention may also comprise a residue derived of an α-amino acid other than arginine.

According to an embodiment, this residue derived of an α-amino acid other than arginine is derived of non-natural or natural amino acids.

According to an embodiment, in formula (I) as defined above, $R_2$ is the side chain of an α-amino acid selected from the group consisting of: alanine, valine, leucine, iosoleucine, phenylalanine, histidine, serine, cysteine, threonine, glycine, and proline.

According to an embodiment, in formula (I) as defined above, $R_2$ is the side chain of ornithine.

According to an embodiment, the polymers of the invention comprise repetitive units having the following formula (I) as defined above, wherein m=0. Such polymers correspond to polymers that do not comprise further amino acid residues (other than arginines).

According to an embodiment, when m=0 in formula (I), the polymers may further comprise repetitive units having the following formula (IV):

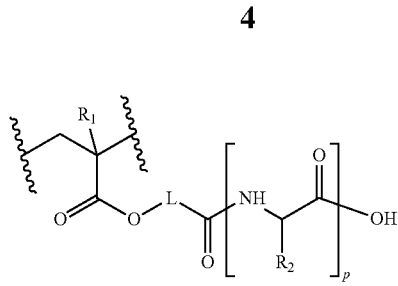

(IV)

wherein:
$R_1$, L, and $R_2$ are as defined above; and
p is an integer comprised from 1 to 10, and preferably from 1 to 5.

According to an embodiment, the polymers of the invention may also be represented by the following formula:

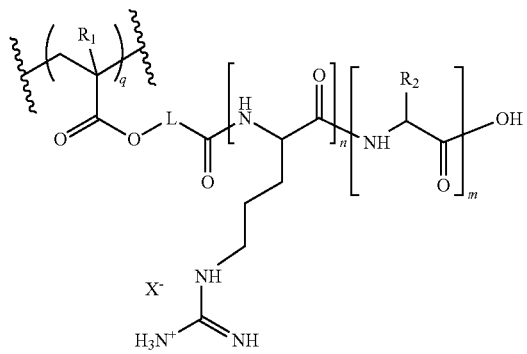

wherein $R_1$, L, $R_2$, $X^-$, m, and n are as defined above in formula (I), and q is comprised from 2 to 100, and preferably from 3 to 50.

As explained hereafter, the polymers of the invention are prepared by RAFT polymerization. The RAFT process involves controlled radical polymerization of a substituted monomer in the presence of a suitable chain transfer agent (RAFT agent or CTA). Commonly used RAFT agents include thiocarbonylthio compounds such as dithioesters, dithiocarbamates, trithiocarbonates, and xanthates.

According to an embodiment, said RAFT agents have the formula $R_3$-$R_4$, $R_3$ and $R_4$ being as defined hereafter.

According to an embodiment, the polymers of the invention have the following formula (V):

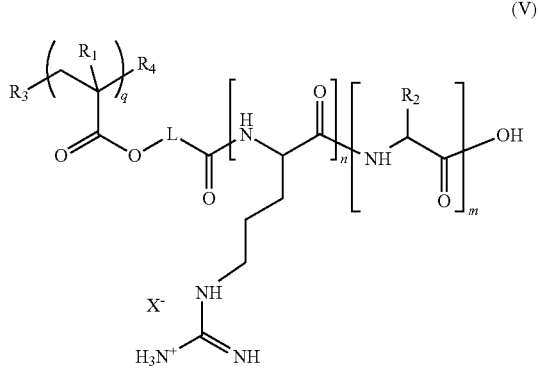

(V)

wherein:

$R_1$, L, $R_2$, $X^-$, m, and n are as defined above;

$R_3$ represents an aliphatic or aromatic chain, possibly substituted by one or several functional groups such as nitrile (—CN), carboxylic acid (—COOH), ester (-COOAlk, Alk representing a ($C_1$-$C_6$)alkyl group), hydroxyl (—OH), azide (—$N_3$) or N-hydroxysuccinimide, and/or possibly interrupted by one or several oxygen atoms;

$R_4$ represents a group —S—C(=S)—Z, Z being the group controlling the reactivity of the C=S bond; and q is comprised from 2 to 100, and preferably from 3 to 50.

Preferably, $R_4$ represents a di- or trithioester group.

According to an embodiment, Z is a phenyl group, optionally substituted, for example with a —CN group.

According to an embodiment, Z is a —S—$Z_1$ group, $Z_1$ being a linear or branched alkyl chain comprising from 1 to 15 carbon atoms, and more preferably comprising 12 carbon atoms.

According to an embodiment, in formula (V), when $R_1$=$CH_3$, $R_3$ represents —C(CN)($CH_3$)—($CH_2$)$_2$—COOH.

According to an embodiment, in formula (V), when $R_1$=H, $R_3$ represents —C($CH_3$)$_2$COOH.

According to an embodiment, in formula (V), when $R_1$=$CH_3$, Z is a phenyl group.

According to an embodiment, in formula (V), when $R_1$=H, Z is —$SC_{12}H_{25}$.

According to another embodiment, the polymers of the invention may also be represented by the following formula:

According to an embodiment, the polymers of the invention have the following formula (VI):

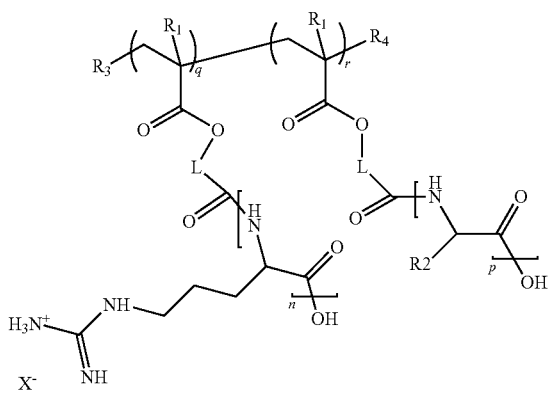

wherein:

$R_1$, L, $R_2$, $X^-$, n, and p are as defined above; and $R_3$ and $R_4$ are as defined above in formula (V);

q is comprised from 2 to 100, and preferably from 2 to 50; and r is comprised from 2 to 100, and preferably from 2 to 50.

A preferred family of polymers of the invention are polymers having the following formula (VII):

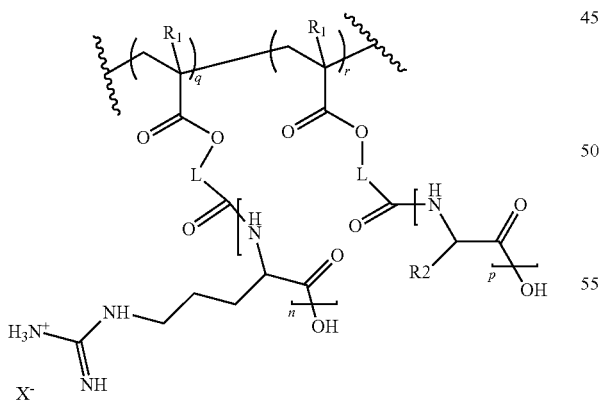

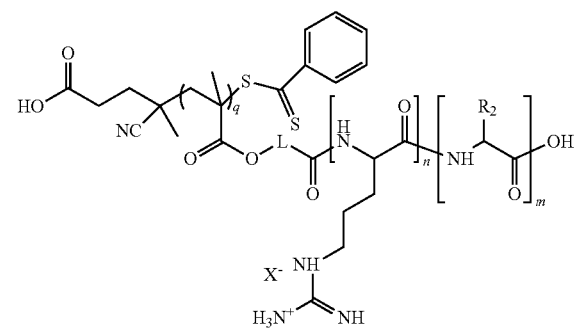

wherein:

L, $R_2$, $X^-$, m, and n are as defined above; and q is comprised from 2 to 100, and preferably from 3 to 50.

Preferably, in formula (VII), L is as defined above and has the formula (II).

According to an embodiment, in formula (VII), m is 0.

According to an embodiment, in formula (VII), n is 5.

wherein:

$R_1$, L, $R_2$, $X^-$, n, and p are as defined above;

q is comprised from 2 to 100, and preferably from 2 to 50; and r is comprised from 2 to 100, and preferably from 2 to 50.

Another preferred family of polymers of the invention are polymers having the following formula (VIII):

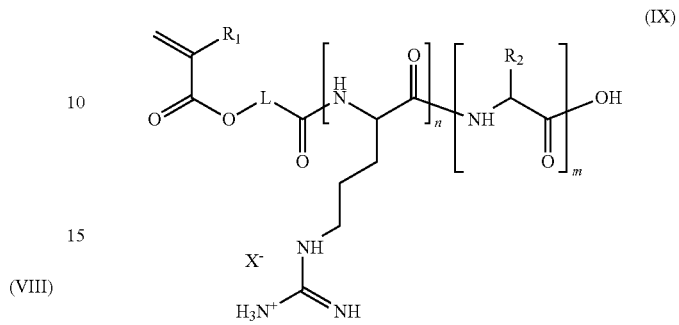

(VIII)

wherein:
X⁻ and n are as defined above; and
q is comprised from 2 to 100, and preferably from 3 to 50.
Preferably, in formula (VIII), n is 5.

The present invention also relates to a method for the preparation of a polymer as defined above, comprising a step of RAFT polymerization of a monomer having the following formula (IX):

(IX)

wherein $R_1$, L, $R_2$, $X^-$, m, and n are as defined above.

According to an embodiment, the monomers of formula (IX) as defined above are prepared on a solid support, such as a resin.

In particular, the method of the invention comprises a first step consisting in the fixation of one protected arginine residue, such as Fmoc-Arg(Pbf)-OH, onto a resin, such as CTC resin.

According to an embodiment, the method of the invention comprises a first step that is carried out on a solid support that consists in the formation of the peptide sequence (made of the arginine and optional further amino acid residues). Preferably, then the linker L is introduced and the polymerizable function is added in order to give the monomers of formula (IX) as mentioned above.

The RAFT polymerization carried out is well-known from the skilled person.

The RAFT process involves controlled radical polymerization of a substituted monomer in the presence of a suitable chain transfer agent (RAFT agent or CTA). Commonly used RAFT agents include thiocarbonylthio compounds such as dithioesters, dithiocarbamates, trithiocarbonates, and xanthates.

As mentioned above, the RAFT agents used in the invention method have the formula $R_3$-$R_4$, $R_3$ and $R_4$ being as defined hereafter.

As preferred RAFT agents, the followings may be mentioned:

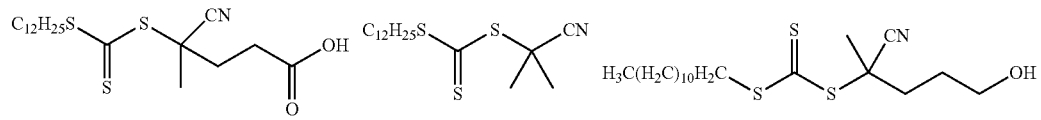

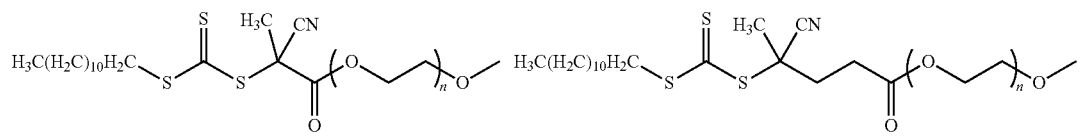

-continued
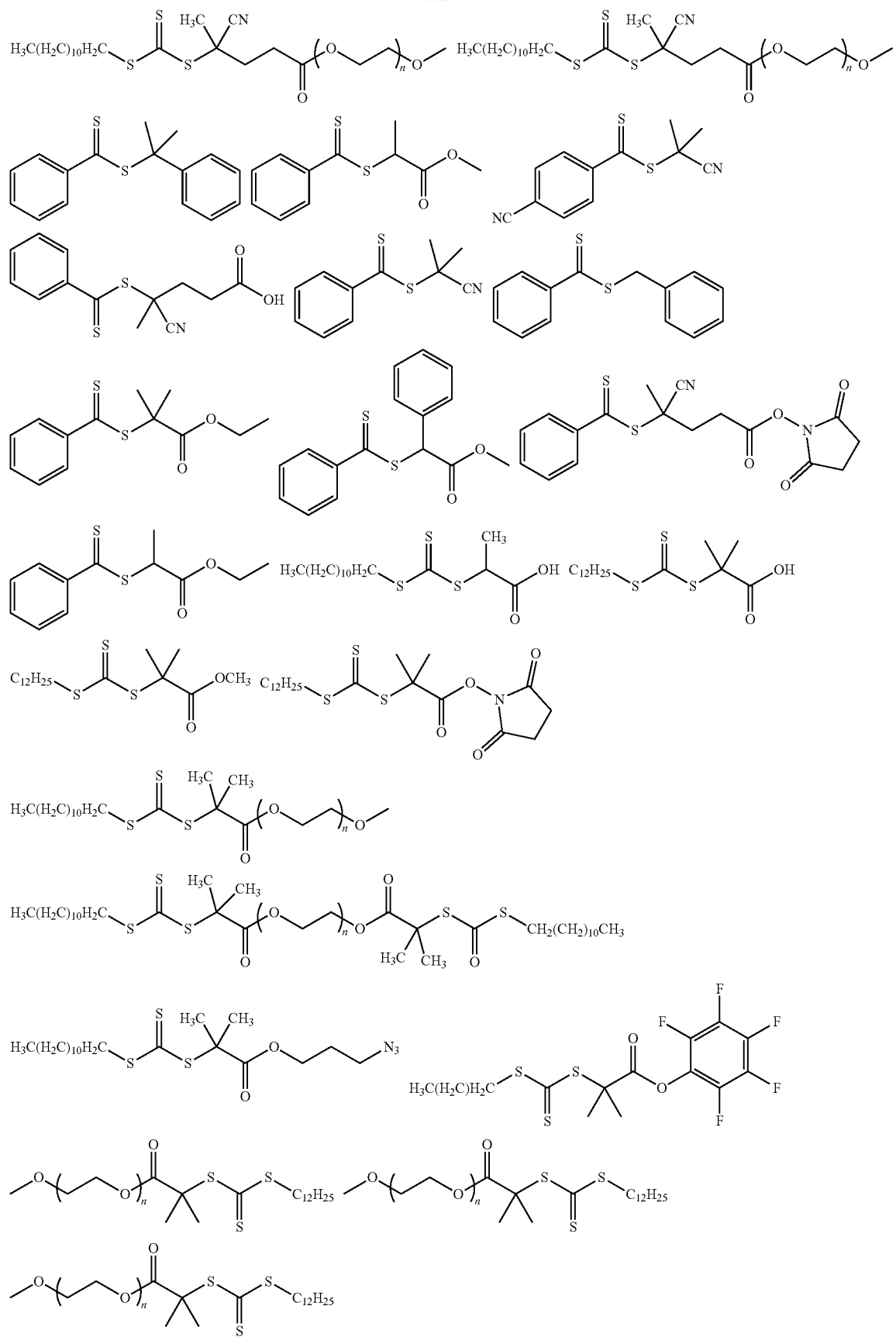

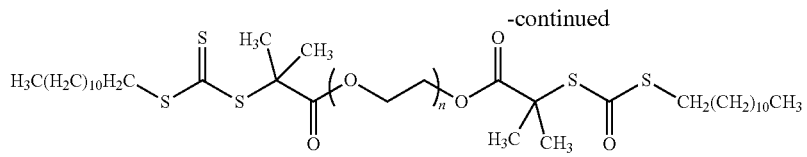
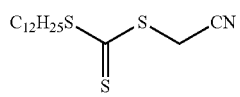

According to an embodiment, when m is 0, the method of the invention comprises a step of RAFT polymerization of monomers having the following formulae (X) and (XI):

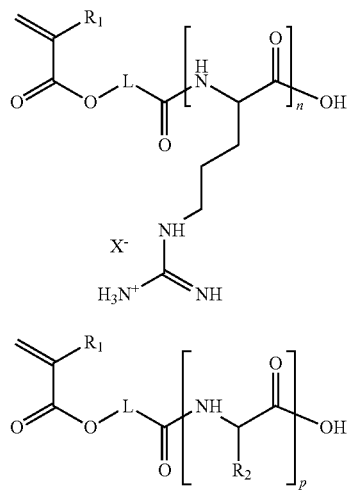

wherein $R_1$, L, $R_2$, $X^-$, n, and p are as defined above.

The present invention also relates to a monomer having one of the following formulae (IX) or (X):

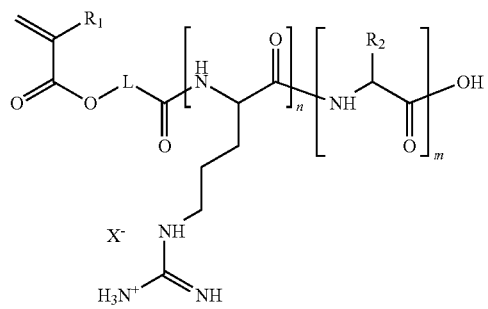

wherein $R_1$, L, $R_2$, $X^-$, m, and n are as defined above.

A preferred family of monomers of the invention consists of monomers having the above formula (X) wherein n is 5. Preferably, in formula (X), L has the formula (II) as defined above.

As mentioned above, the polymers of the invention are advantageous as they have thermoresponsive properties in aqueous media. Indeed, they have UCST properties. The UCST (upper critical solution temperature) is the critical temperature above which the components of a mixture are miscible in all proportions.

In particular, their chains are agglomerated at low temperature (thanks to the stacking of the arginine units of the polymer) and their chains are "released" when heated at a temperature higher than 37° C. (through the break of the hydrophobic interactions formed between the arginine units and solubilization of the polymer).

The UCST of the polymer of the invention may be modulated depending on the composition of the polymer, the polymerization degree of the polymer and also of the concentration of said polymer in water.

The present invention also relates to the use of the polymers of the invention as defined above, for the delivery or encapsulation of a drug.

Several kinds of drugs may be mentioned: small molecules such as doxorubicin or paclitaxel, but also peptides, proteins or nucleic acids such as DNA, RNA or SiRNA molecules.

The present invention also relates to the use of the polymers of the invention as defined above, for use as antibacterial compound.

The polymers of the invention may also be used for the functionalization of surfaces.

BRIEF DESCRIPTION OF DRAWINGS

FIG. 1. UCST behavior of P(MA-R5)$_{10}$ monitored by turbidimetry on heating (open symbols) and cooling (filled symbols): (a) transmittance versus temperature curves of aqueous solutions at 1 (squares), 2 (triangles) and 5 (circles) mg mL$^{-1}$; inset photos of solutions at 20 and 85° C. (b) evolution of the UCST, determined at 5 mg mL$^{-1}$, as a function of the degree of polymerization.

EXAMPLES

Materials 2,2'-Azobis[2-(2-imidazolin-2-yl)propane] dihydrochloride (VA-044, TCI, 98%), 2-chlorotrityl chloride (CTC) resin (100-200 mesh, 1.6 mmol g$^{-1}$, Iris Biotech), Cuprisorb (Seachem), Na-Fmoc-N,-(2,2,4,6,7-pentamethyldihydrobenzofuran-5-sulfonyl)-L-arginine (Fmoc-Arg(Pbf)-OH, Fluorochem, 95%) and pyridine (Fluka, 99.5%) were purchased. Acetic acid (AcOH, 100%) and hydrochloric acid (HCl, 37%) were purchased from Roth. Acetonitrile (ACN, 99.7% HPLC grade), n-butanol (99%), N,N-diisopropylethylamine (DIPEA, 99%), N,N,N',N'',N''-pentamethyl-diethylenetriamine (PMDETA, 98%), O-(benzotriazol-1-yl)-N,N,N',N'-tetramethyl uronium hexafluorophosphate (HBTU, 98%), propargyl methacrylate ester (97%), trifluoroacetic acid (TFA, 99%) and 2,2,2-trifluoroethanol (TFE, 99%) were purchased from Alfa Aesar. Anhydrous dichloromethane (DCM, 99.9%), anhydrous N,N-dimethylformamide (DMF, 99.8%), and ninhydrin (95%) were purchased from Acros Organics. α-Cyano-4-hydroxy-cinnamic acid (CHCA), deuterium oxide ($D_2O$, 99.96%), formic acid (HCOOH, 98%), isopropanol (99.7%), piperidine (89%), phenol (99%), potassium cyanide (KCN, 98%), sodium hydroxide (NaOH, 98%) and triisopropylsilane (TIPS, 98%), were purchased from Sigma Aldrich. 4-Cyano-4-(phenylcarbonothioylthio)pentanoic acid (CPABD, 97%) and 1-hydroxybenzotriazole hydrate (HOBt, 99%, water content >20 wt.-%) were purchased from ABCR. Absolute ethanol (EtOH, 99.8), DMF (99.8%), magnesium sulfate ($MgSO_4$, 98.7%), methanol (MeOH, 99.8%), and sodium chloride (NaCl, 99%) were purchased from VWR Chemicals. Acetone (99.8%), %), DCM (99.8%) was purchased from the Dasit Group (Carlo Erba reagents). All compounds if not mentioned are employed as received. Copper(I) bromide (CuBr, 98%) was purchased from Sigma Aldrich, washed with AcOH, subsequently with absolute EtOH, to be filtered and stored under inert atmosphere prior to use. 6-Azidohexanoic acid was synthesized as previously reported (D. Chan-Seng, J.-F. Lutz, *ACS Macro Lett.,* 2014, 3, 291). The Kaiser test was conducted as described in the literature (E. Kaiser, R. L. Colescott, C. D. Bossinger, P. I. Cook, *Anal. Biochem.,* 1970, 34, 595). All the syntheses on solid support were performed in solid phase extraction (SPE) tubes (60 mL polypropylene SPE tubes with polyethylene frits, 20 μm porosity purchased from SUPELCO®).

Characterization Techniques

Nuclear magnetic resonance (NMR) spectra were recorded on a 400 MHz Bruker Avance spectrometer equipped with Ultrashield magnets at 25° C. or a 400 MHz Bruker Avance III HD at 65° C. For the determination of the monomer conversion, the kinetic points of the polymerization mixtures were determined at 65° C. by 1-D NOESY experiments (M. Findeisen and S. Berger, in 50 *and more essential NMR experiments: A detailed guide,* Wiley, Weinheim, 2013) with 256 scans and a recycle delay (d1) of 2.4 s. The water suppression was achieved with pre-saturation occurring during the relaxation delay and the mixing time 100 ms.

Fourier transform infrared (FTIR) spectra were recorded on a Bruker Vertex 70 spectrometer using the attenuated total reflectance (ATR) technique.

Matrix-assisted laser desorption/ionization-Time of flight (MALDI-ToF) mass spectra were acquired on a TOF spectrometer (Autoflex Speed LRF, Bruker Daltonics, Bremen, Germany) equipped with a nitrogen laser (λ=337 nm). An external multi-point calibration was carried out before each measurement using the singly charged peaks of a standard peptide mixture (0.4 μM in water with 1% HCOOH). Scan cumulation and data processing were performed with FlexAnalysis 3.0 software. Matrix solutions were freshly prepared from a saturated CHCA solution in $H_2O$/ACN/HCOOH (50/50, 1%). A 1/1 sample solution/matrix was prepared and 1 μL deposited on the stainless-steel plate.

Visible spectroscopy was conducted on a CARY 5000 spectrophotometer (Agilent Technologies) equipped with a thermostatic Peltier multicell holder (−10 to 100° C.).

Preparation of Monomers

Synthesis of Pentaarginine-g-Methacrylate (Ma-R5)

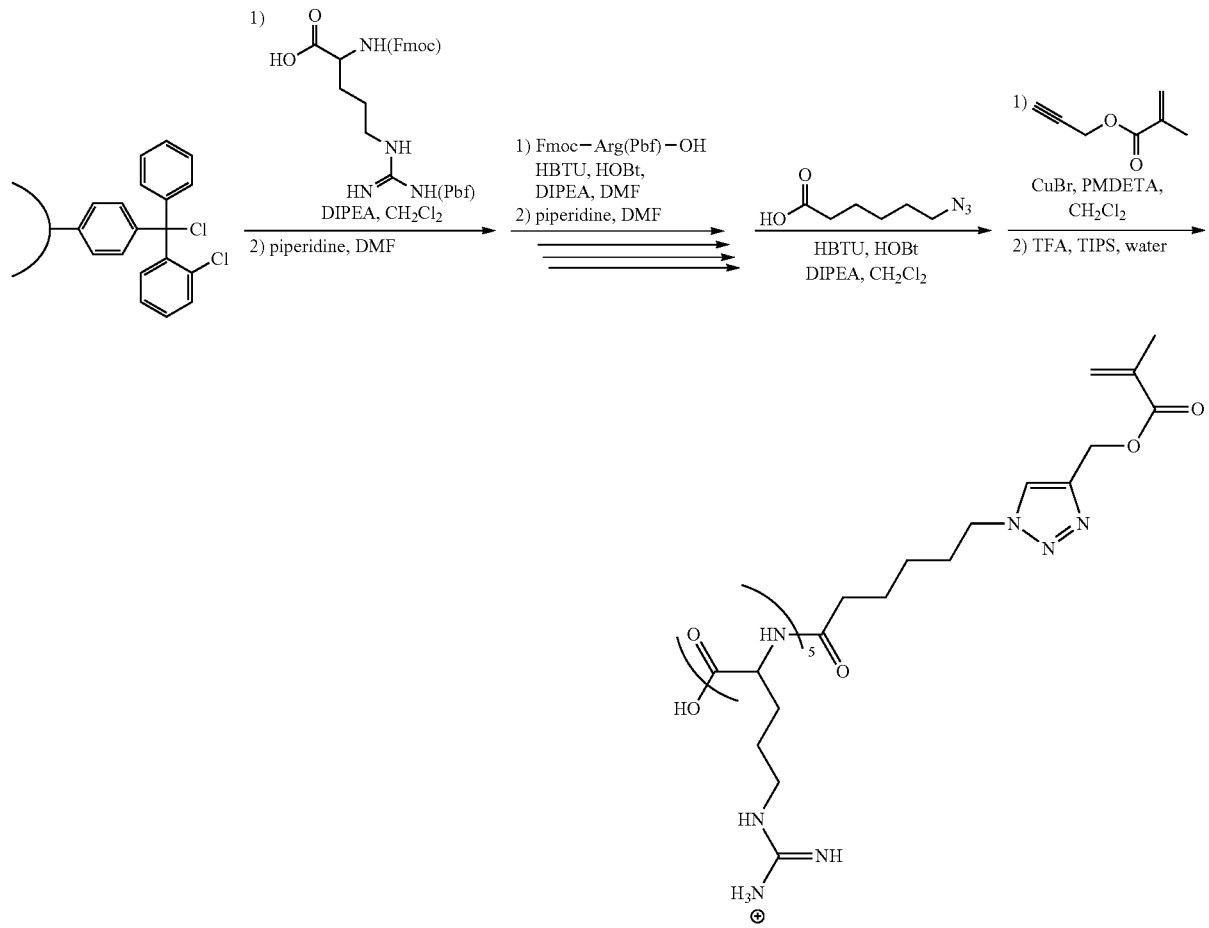

Loading of the resin. CTC resin (1.5 g, 2.40 mmol, 1 eq.) was weighed in a SPE tube and washed six times with anhydrous DCM (15 mL). Fmoc-Arg(Pbf)-OH (3.1 g, 4.80 mmol, 2 eq.) was added to the resin. The tube was degassed by performing three vacuum/argon cycles. Under argon, 15 mL of anhydrous DCM was added to the tube, followed by 1.7 mL of DIPEA (9.60 mmol, 4 eq.). The tube was agitated using an orbital stirrer for 2 h (500 rpm) at room temperature. The solution was filtered and the resin was rinsed six times with 15 mL of DMF after 2 min stirring. 30 mL of DCM/MeOH/DIPEA (80/15/5) was added to the tube and stirred for 10 min at room temperature (twice). The resin was then rinsed six times with DMF (15 mL). The deprotection of the Fmoc group was performed by adding 20 mL of a 25 v % piperidine solution in DMF to the tube that was agitated for 6 min. After filtration, this step was repeated with an agitation of 40 min. The resin was washed six times with DMF (15 mL), six times with DCM (15 mL), three times with MeOH (15 mL) and finally six times with DCM (15 mL). The resin was dried under vacuum for 36 h. The loading density of the resin was determined by gravimetry as 1.17 mmol Pbf-protected arginine per gram of resin (73%).

Addition of protected arginine residues. Fmoc-Arg(Pbf)-OH (3.4 g, 5.26 mmol, 3 eq.), HOBt (0.7 g, 5.26 mmol, 3 eq.), HBTU (2.0 g, 5.26 mmol, 3 eq.) were added to the resin followed by three vacuum/argon cycles. DIPEA (1.8 mL, 10.5 mmol, 6 eq.) and anhydrous DMF (15 mL) were added to the tube under argon. The reaction was agitated for 4 h at room temperature with an orbital stirrer (500 rpm). The resin was washed six times with DMF (15 mL). The Kaiser test was performed: i) if blue, the coupling reaction was repeated or ii) if yellow, the Fmoc deprotection reaction was performed as previously using a solution of piperidine in DMF.

Insertion of 6-azidohexanoic acid. To the vessel, 6-azidohexanoic acid (1.7 g, 5.26 mmol, 3 eq.), HOBt (0.7 g, 5.26 mmol, 3 eq.), HBTU (2.0 g, 5.26 mmol, 3 eq.) were added. Three vacuum/argon cycles were performed. 30 mL anhydrous DMF and DIPEA (1.8 mL, 10.5 mmol, 6 eq.) were added to the tube that was agitated at room temperature with an orbital shaker (500 rpm) for 2 h. The solution was filtered and the resin was rinsed six times with DMF (15 mL), six times with MeOH (15 mL), and six times with DCM (15 mL). FTIR spectroscopy was performed to confirm the presence of the azide (2100 cm$^{-1}$).

End-capping with methacrylate group. CuBr (126 mg, 0.877 mmol, 0.5 eq.) was added to the tube followed by three vacuum/argon cycles. Propargyl methacrylate ester (661 µL, 5.26 mmol, 3 eq.), PMDETA (366 µL, 1.87 mmol, 1.00 eq.) were degassed, dissolved in 20 mL anhydrous DCM and transferred to the previously degassed tube. The tube was agitated with an orbital shaker (500 rpm) for 16 h. The solution was filtered and the resin was rinsed multiple times (at least six times for each solvent, 20 mL) with DMF, MeOH and DCM until the color blue/green was not observed. Completion was monitored by FTIR spectroscopy (disappearance of the azide band at 2100 cm$^{-1}$).

Cleavage from the resin. The resin was dried under vacuum overnight prior to be mixed in a 100 mL round bottom flask with 9.7 mL of a TFA/TIPS/H$_2$O (95/2.5/2.5) mixture. The solution was stirred at room temperature for 2 h and then the filtrate was collected. These steps were repeated twice and the filtrate was concentrated by rotary evaporation at room temperature. After dilution in 40 mL MilliQ water and 10 mL DCM, the product was stirred with Cuprisorb overnight. After filtration and rinsing the Cuprisorb beads with 50 mL water, the filtrate was extracted with 50 mL DCM three times. The aqueous phase was slightly acidified (1 mL 0.3 N HCl is added) and precipitated in cold acetone (250 mL). The white solid was redissolved in 5 mL 0.3 N HCl solution and precipitated again in cold acetone (250 mL). The precipitation was repeated once. After filtration the white solid was dissolved in MilliQ water prior to freeze-drying. The compounds were kept in the dark and stored at −20° C.

676 mg (36.3%). $^1$H NMR (400 MHz, D$_2$O) δ 8.12 (s, 1H), 6.17 (s, 1H), 5.76 (s, 1H), 5.35 (s, 2H), 4.47 (t, J=6.8 Hz, 2H), 4.39 (dd, J=14.6, 5.8 Hz, 4H), 4.32-4.24 (m, 1H), 3.35-3.18 (m, 10H), 2.32 (t, J=7.2 Hz, 2H), 2.06-1.55 (m, 29H), 1.39-1.20 (m, d, 2H). $^{13}$C NMR (126 MHz, D$_2$O) δ 176.9, 175.3, 174.0, 173.5, 169.1, 156.7, 142.7, 135.5, 127.3 125.4, 57.7, 53.3, 53.2, 52.6, 51.8, 50.3, 40.5, 35.0, 29.0, 28.0, 27.7, 25.0, 24.4, 17.3. MALDI-ToF MS (m/z) [M+H]$^+$ calculated for $C_{43}H_{80}N_{23}O_9$, 1062.651; found 1062.705.

Preparation of Polymers

Here is described the first fully charged polyelectrolyte based on oligopeptide side chains with a reversible UCST behavior in pure water without addition of any specific counterions. This polymer is a cationic comb homopolymer with oligoarginine pendent chains synthesized by RAFT polymerization of pentaarginine-g-methacrylate (MA-R5). The preparation of methacrylate-based monomers bearing a peptide sequence requires the development of synthesis strategies to minimize the Michael side reaction affecting strongly the purity of the macromonomers synthesized. Here an original strategy is proposed by combining solid-phase peptide synthesis and copper-assisted alkyne-azide cycloaddition. MA-R5 was prepared by solid-phase peptide synthesis through the iterative addition of Fmoc-Arg(Pbf)-OH onto a 2-chlorotrityl chloride resin using HBTU as coupling agent and HOBt as racemization inhibitor. The on-resin protected pentaarginine was amidated with 6-azidohexanoic acid followed by a copper-assisted alkyne-azide cycloaddition with propargyl methacrylate. The macromonomer was cleaved from the resin using a solution of trifluoroacetic acid (TFA) and isolated by precipitation in cold acetone in 22% yield with a purity of higher than 90%. The structure of the macromonomer was confirmed by $^1$H and $^{13}$C NMR spectroscopies, and mass spectrometry. RAFT polymerization of MA-R5 targeting different degree of polymerization (DP$_{n,th}$) was performed in water/methanol mixture (1:1 v/v) at pH 3 using 4-(cyanopentanoic acid)-4-dithiobenzoate (CPABD) as chain transfer agent and an azo initiator (2,2'-azobis[2-(2-imidazolin-2-yl)propane] dihydrochloride, VA-044) for 24 h at 60° C. as depicted in Scheme 1 using conditions gathered in Table 51.

Polymerization of MA-R5 (P(MA-R5))

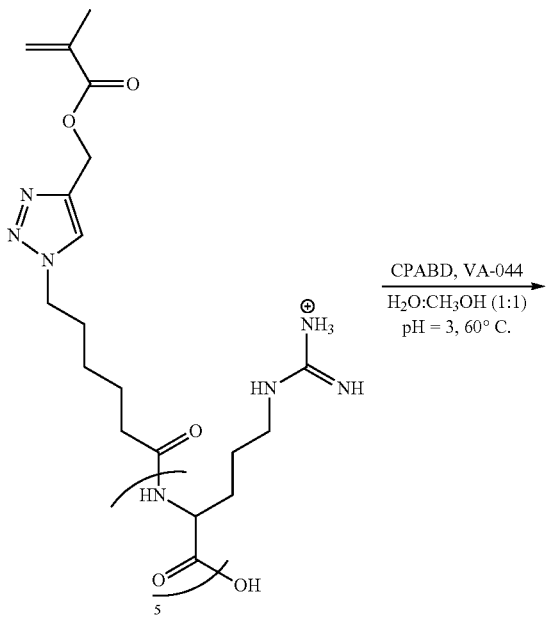
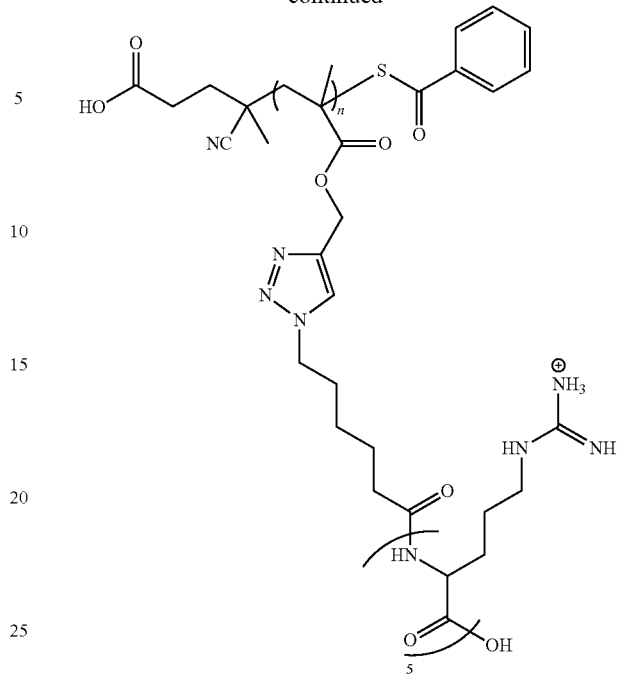

Scheme 1. Comb polymer with pendent oligoarginines P(MA-R5)s prepared by RAFT polymerization of pentaarginine-g-methacrylate (MA-R5) synthesized by solid-phase peptide synthesis.

All the polymerizations were conducted with a constant amount of MA-R5 (106 mg, 100.0 μmol) and solvent (5 mL), while the concentration of initiator (VA-044) and RAFT agent (CPABD) was adjusted to the targeted degree of polymerization ($DP_{target}$).

MA-R5 was placed in a 10 mL Schlenk tube and dissolved in 2.5 mL HCl aqueous solution (pH=2.3). From solutions of CPABD (40 mmol $L^{-1}$) and VA-044 (16 mmol $L^{-1}$) prepared in MeOH, a specific volume was withdrawn and added to the monomer solution according to $DP_{target}$ (Table S1). MeOH was added to reach an equivolumetric ratio of water and MeOH. Five freeze-pump-thaw cycles were performed and the reaction mixture was stirred at 60° C. for 24 h. An aliquot was taken for the determination of the conversion while the reaction mixture was still hot. The conversion was determined by $^1$H NMR spectroscopy at 65° C. in $D_2O$. The conversion was obtained by estimation of the monomer C=C signal (6.17 ppm or 5.76 ppm) as compared to the proton signal from the triazole ring (8.12 ppm). After polymerization, the reaction mixture was cooled down, exposed to air and let to precipitate at 5° C. overnight. The supernatant was removed, while the white sticky precipitate was dissolved in 1 mL HCl aqueous solution (pH=2.3), heated for 1 min at 60° C. until complete dissolution, and let to precipitate at 5° C. overnight. This operation was repeated once. Subsequently the supernatant was removed and the white solid dissolved in 1 mL HCl aqueous solution (pH=2.3) to be dried by rotary evaporation without heat. The purified polymer P(MA-R5) was characterized by 1H NMR spectroscopy at 65° C. in $D_2O$, for which the $DP_{exp}$ was evaluated from the chain-end aromatic proton assigned at 7.83 ppm and the polymer backbone from protons assigned at 1.20-1.09 ppm.

TABLE S1

RAFT polymerization conditions for P(MA-R5)

| polymers | MA-R5:CPABD:VA-044[a] | $DP_{target}$ | CPABD $V^{[b]}$/μL | VA-044 $V^{[b]}$/μL | MeOH $V^{[b]}$/μL | $H_2O$ (pH = 2.3) $V^{[b]}$/mL |
|---|---|---|---|---|---|---|
| P(MA-R5)$_3$ | 100:10:4 | 10 | 250 | 250 | 2000 | 2.5 |
| P(MA-R5)$_{10}$ | 100:5:0.8 | 20 | 125 | 50 | 2325 | 2.5 |

TABLE S1-continued

RAFT polymerization conditions for P(MA-R5)

| polymers | MA-R5:CPABD:VA-044[a] | $DP_{target}$ | CPABD $V^{[b]}/\mu L$ | VA-044 $V^{[b]}/\mu L$ | MeOH $V^{[b]}/\mu L$ | $H_2O$ (pH = 2.3) $V^{[b]}/mL$ |
|---|---|---|---|---|---|---|
| P(MA-R5)$_{29}$ | 100:2:0.32 | 50 | 50 | 20 | 2430 | 2.5 |
| P(MA-R5)$_{50}$ | 100:1:0.16 | 100 | 25 | 10 | 2465 | 2.5 |

[a]molar ratio of macromonomer MA-R5, RAFT agent (CPABD) and initiator (VA-044),
[b]volumes used for 100.0 μmol MA-R5 using 40 mmol L$^{-1}$ CPABD and 16 mmol L$^{-1}$ VA-044 solutions.

The polymer obtained (P(MA-R5)) was isolated by precipitation from the polymerization medium on cooling. The degree of polymerization of each polymer (Table 1) was determined by $^1$H NMR spectroscopy, either via the conversion of the polymerization ($DP_{n,th}$) assuming the "living" character of RAFT polymerization or by analyzing the integrals of the terminal group (7.83 ppm, aromatic proton of RAFT agent) and the repeat units (1.09-1.20 ppm, methyl of the polymethacrylate backbone) of the purified polymer ($DP_{n,exp}$). Due to the high molecular weight of the macromonomer (1061.6 g mol$^{-1}$), the determination of $DP_{n,exp}$ was not possible when targeting high $DP_{n,th}$. Poly(methacrylate-g-pentaarginine)s P(MA-R5)s were obtained with a $DP_n$ of 3, 10, 29 and 50.

TABLE 1

Characteristics of the comb polymers synthesized.

| Sample | $DP_{target}$[a] | Conversion[b] [%] | $DP_{n,th}$[c] | $DP_{n,exp}$[d] | $N_R$[e] |
|---|---|---|---|---|---|
| P(MA-R5)$_3$ | 10 | 25 | 3 | 3 | 15 |
| P(MA-R5)$_{10}$ | 20 | 52 | 10 | 7 | 50 |
| P(MA-R5)$_{29}$ | 50 | 57 | 29 | n.d. | 145 |
| P(MA-R5)$_{50}$ | 100 | 50 | 50 | n.d. | 250 |

[a]Targeted degree of polymerization for 100% monomer conversion.
[b]Determined by $^1$H NMR spectroscopy.
[c]Degree of polymerization obtained from monomer conversion.
[d]Degree of polymerization determined by analysis of the terminal group on the $^1$H NMR spectrum.
[e]Number of arginine residues per polymer chain calculated from $DP_{n,th}$.
n.d. stands for not determined.

Turbidimetry Experiments by Visible Spectroscopy

The samples were introduced in a closed quartz cuvette and let 10 min to stabilize at the desired temperature. The experiment started with a cooling step from 95 to 10° C. at a rate of 1° C. min$^{-1}$, followed by an equilibrating step for 10 min, before to heat the sample back to the final temperature at the same rate. The absorbance was measured for each degree at 600 nm after zeroing the absorbance at high temperature.

The UCST behavior of the different polymers was investigated in water by turbidimetry at a wavelength of 600 nm. Polymer solutions were prepared in pure water at different concentrations (1, 2 and 5 mg mL$^{-1}$) and underwent a heating and cooling process between 10 and 85° C. at 1° C. min$^{-1}$. FIG. 1a depicts turbidity measurements of P(MA-R5)$_{10}$ showing sharp UCST-type transitions with narrow hysteresis during heating and cooling cycles. The cloud point ($T_{CP}$) and clearing point ($T_{CL}$) were determined at the inflection point (Z. Osváth, B. Iván, Macromol. Chem. Phys. 2017, 218, 1600470) on the cooling and heating curves, respectively. $T_{CP}$ increased from 31 to 51° C. (from 32 to 52° C. for $T_{CL}$) with the polymer concentration (Table 2). Interestingly at 2 mg mL$^{-1}$, P(MA-R5)$_{10}$ gave a phase transition temperature at 36° C. on heating, near the body temperature. Though the monomer MA-R5 had no UCST, all the other polymers, i.e. P(MA-RA)$_3$, P(MA-R5)$_{29}$ and P(MA-R5)$_{50}$, showed a UCST with a less sharp transition. Even with a degree of polymerization of 3, a phase transition was observed between 23 and 17° C. thanks to the presence of fifteen arginine residues per polymer chains. The same dependency of UCST on polymer concentration was obtained in the range of 10 to 85° C. with a loss at 1 mg mL$^{-1}$. The phase transition was found to be dependent on the molecular weight of the polymers. $T_{CP}$ increased from 22° C. up to a plateau around 87° C. for P(MA-R5)$_{29}$ and P(MA-R5)$_{50}$ (FIG. 1b). This evolution of $T_CP$ could be attributed to the influence of the end groups for the shortest polymer chains that became insignificant above a certain degree of polymerization. We can underline that although arginine residues were protonated, poly(methacrylate-g-pentaarginine)s possessed an UCST in pure water even for a high number of arginine residues (at least up to 250 cationic charges per chain).

TABLE 2

Thermoresponsive properties of P(MA-R5)s.

| Sample | Concentration [mg mL$^{-1}$] | $T_{CP}$[a] [° C.] | $T_{CL}$[b] [° C.] |
|---|---|---|---|
| MA-R5 | 2 | none | none |
| P(MA-R5)$_3$ | 5 | 22 | 23 |
|  | 2 | 17 | 18 |
|  | 1 | none | none |
| P(MA-R5)$_{10}$ | 5 | 51 | 52 |
|  | 2 | 33 | 36 |
|  | 1 | 31 | 32 |
| P(MA-R5)$_{29}$ | 5 | 86 | 86 |
|  | 2 | 60 | 66 |
|  | 1 | none | none |
| P(MA-R5)$_{50}$ | 5 | 87 | 89 |
|  | 2 | 54 | 55 |
|  | 1 | none | none |

Cloud ($T_{CP}$) and clearing ($T_{CL}$) temperatures at the inflexion point upon [a] cooling and [b] heating, determined by turbidimetry in water (600 nm, 1° C. min$^{-1}$).

The invention claimed is:

1. A polymer comprising repetitive units having the following formula (I):

(I)

wherein:
R$_1$ is H or Me;
L is a linker;
R$_2$ is the side chain of an α-amino acid being other than arginine;
m is 0 or an integer comprised from 1 to 10;
n is an integer comprised from 1 to 10; and
X$^-$ is a counterion.

2. The polymer of claim 1, wherein L is a linker having the following formula (II):

-A$_1$-A$_2$-A$_3$- (II)

wherein:
A$_1$ is a (C$_1$-C$_6$)alkylene group;
A$_2$ is a group obtained by alkyne-azide cycloaddition reaction; and
A$_3$ is a (C$_1$-C$_{10}$)alkylene group, optionally interrupted by one or several oxygen atoms.

3. The polymer of claim 2, wherein A$_2$ is a triazole group.

4. The polymer of claim 1, wherein L has the following formula:

(III)

5. The polymer of claim 1, wherein m=0.

6. The polymer of claim 5, further comprising repetitive units having the following formula (IV):

(IV)

wherein:
p is an integer comprised from 1 to 10.

7. The polymer of claim 1, having the following formula (V):

(V)

wherein:
R$_1$, L, R$_2$, X$^-$, m, and n are as defined in claim 1;
R$_3$ represents an aliphatic or aromatic chain, optionally substituted by one or several functional groups and/or optionally interrupted by one or several oxygen atoms;
R$_4$ represents a group —S—C(=S)—Z, Z being the group controlling the reactivity of the C=S bond; and
q is comprised from 2 to 100.

8. The polymer of claim 6, having the following formula (VI):

(VI)

wherein:
R$_3$ represents an aliphatic or aromatic chain, optionally substituted by one or several functional groups and/or optionally interrupted by one or several oxygen atoms;
R$_4$ represents a group —S—C(=S)—Z, Z being the group controlling the reactivity of the C=S bond;
q is comprised from 2 to 100; and
r is comprised from 2 to 100.

9. The polymer of claim 1, having the following formula (VII):

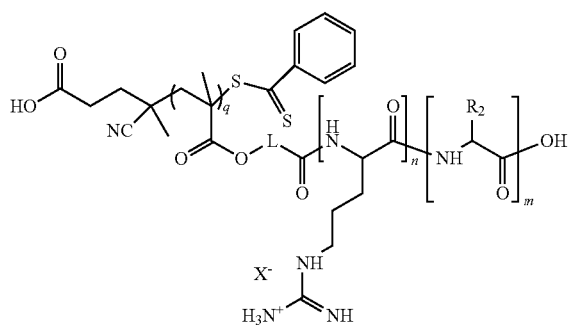
(VII)

wherein:
L, R₂, X⁻, m, and n are as defined in claim 1, and
q is comprised from 2 to 100.

10. The polymer of claim 1, having the following formula (VIII):

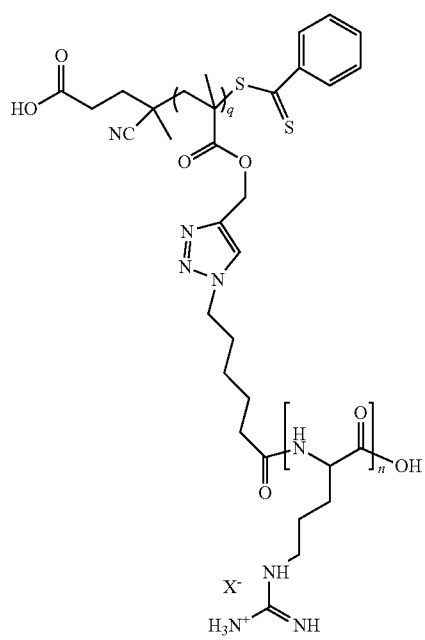
(VIII)

wherein:
X⁻ and n are as defined in claim 1; and
q is comprised from 2 to 100.

11. A method for the preparation of a polymer of claim 1, comprising a step of RAFT polymerization of a monomer having the following formula (IX):

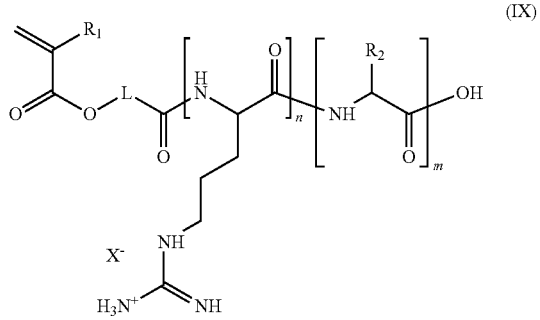
(IX)

wherein $R_1$, L, $R_2$, $X^-$, m, and n are as defined in claim 1.

12. The method of claim 11, wherein m is 0, and comprising a step of RAFT polymerization of monomers having the following formulae (X) and (XI):

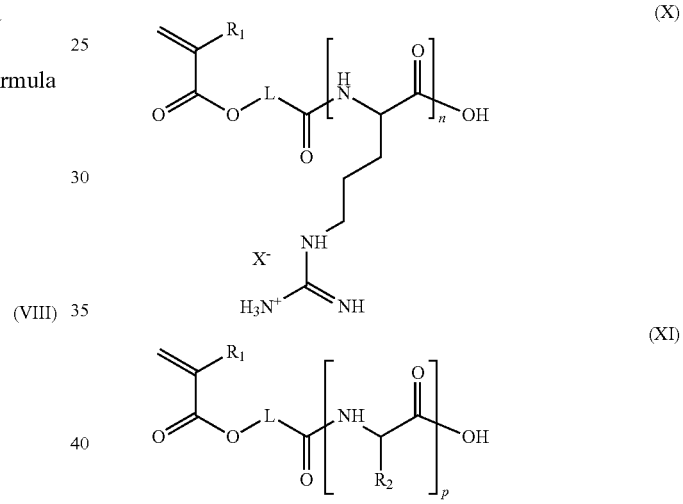

wherein p is an integer comprised from 1 to 10.

13. A monomer having one of the following formulae (IX) or (X):

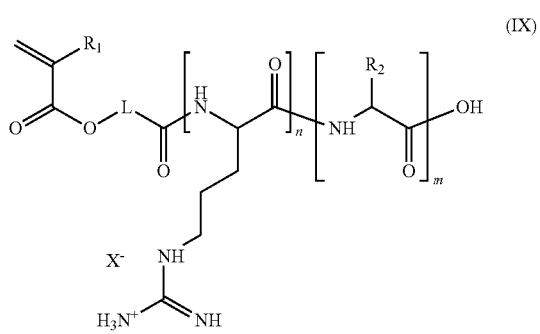
(IX)

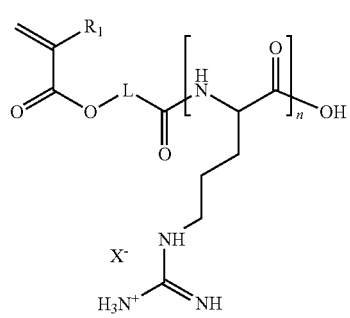

wherein $R_1$, L, $R_2$, $X^-$, m, and n are as defined in claim 1.

14. A method for delivering a drug to a subject in need thereof, comprising
encapsulating the drug with the polymer of claim 1, and delivering the drug to the subject.

15. A method for treating a bacterial infection in a patient in need thereof, comprising
administering to the patient a pharmaceutically acceptable amount of the polymer of claim 1.

* * * * *